United States Patent [19]

Bartelink

[11] 4,232,195

[45] Nov. 4, 1980

[54] TELEPHONE RESPONDER APPARATUS

[76] Inventor: Everhard H. B. Bartelink, 15 Ridge Rd., Concord, N.H. 03301

[21] Appl. No.: 926,104

[22] Filed: Jul. 19, 1978

[51] Int. Cl.³ ............................................. H04M 3/38
[52] U.S. Cl. .................................. 179/2 A; 179/84 C
[58] Field of Search ............ 179/2 A, 5 R, 5 P, 84 R, 179/84 C, 89

[56] References Cited

U.S. PATENT DOCUMENTS

| | | | |
|---|---|---|---|
| 3,324,245 | 6/1967 | Stenhammar | 179/2 A |
| 3,702,904 | 11/1972 | Bard | 179/2 A |
| 4,006,316 | 2/1977 | Bolgiano | 179/2 A |
| 4,016,360 | 4/1977 | Cane | 179/2 A |
| 4,085,292 | 4/1978 | Leslar et al. | 179/5 R |

Primary Examiner—Robert S. Tupper
Assistant Examiner—Joseph A. Popek
Attorney, Agent, or Firm—Cesari & McKenna

[57] ABSTRACT

Responder apparatus enables a telephone subscriber to obtain a status report of the conditions at his premises by placing a telephone call thereto from a remote location. The subscriber dials his telephone number and permits his telephone subset to ring an abnormally large number of times n. The responder apparatus, which is installed at the premises, counts the rings and, upon the nth ring, creates a temporary off-hook condition on the subscriber's line. During the off-hook period, a status reporting unit sends signals over the line to the calling subscriber which are indicative of the conditions at the premises. The signals, which are generated under the control of various sensors at the premises and which may be in the form of coded tones, may indicate that the temperature of the premises is or is not normal, that intrusion has or has not taken place, and numerous other such conditions. Upon receipt of additional telephone calls from the subscriber within specified periods of time, the responder apparatus may also be used to initiate various control functions at the premises. These control functions may include turning lights, appliances or other devices on or off, changing a thermostat setting, and numerous other such functions

13 Claims, 2 Drawing Figures

TELEPHONE RESPONDER APPARATUS

BACKGROUND OF THE INVENTION

This invention relates generally to apparatus for monitoring and/or controlling premises from a remote location and, more particularly, to apparatus of that type that utilizes existing telephone lines and equipment to effect the monitoring and control.

There are many occasions when owners of premises, such as homes, summer homes, offices, businesses and the like are absent from their premises for certain periods of time and would like to be assured during those periods that their premises are in a "normal" condition. The "normal" condition may, for example, be one in which the temperature of the premises is within some predetermined range, in which electric power is available, and/or in which no intrusion into the premises has taken place. Numerous other types of conditions may be considered important for monitoring by the absent owner depending upon the nature and contents of the premises and upon the owner's subjective desires.

It has been recognized that one convenient way of providing this type of supervision is by utilizing existing telephone lines and equipment for reporting purposes. In one system which has been proposed, specially designed auxiliary equipment is installed at the subscriber's premises which is adapted to sense "abnormal" conditions at the premises and to report those conditions by means of automatically dialing a telephone call to an entity which can take action on them. The entity might be the fire department in the case where the abnormal condition is an excessively high temperature or excessive smoke, the police department in the case where the abnormal condition is an intrusion, or the owner's answering service in the case where the abnormal condition corresponds to some other, less urgent type of problem.

The auxiliary equipment installed at the subscriber's premises in systems of this type is generally rather complex and expensive. The equipment not only has to be capable of sensing abnormalities at the premises, but also has to be capable of automatically dialing the appropriate entity to be informed and of sensing when the alarm-reporting call has been completed.

Supervisory systems have also been proposed which operate under the control of the telephone company central office equipment serving the subscriber. Generally, in systems of the latter type, special equipment must be installed both at the subscriber's premises and at the central office. In one system of this type, a special short-duration control signal is transmitted from the central office to each subscriber participating in the supervisory service. The control signal forces the special equipment at the subscriber's premises to go off-hook for a short period of time and to report on the conditions at the premises. The transmitted control signals must be of short duration because the central office must perform a rapid scan over many subscribers in order to insure reasonably short time intervals between the successive checks at each monitored location.

In another central office involving system, which system is disclosed in my co-pending patent application filed on even data herewith and entitled "Remote Supervisory System", Ser. No. 926,102, special auxiliary equipment at the subscriber's premises creates a temporary off-hook condition on the subscriber's line. During the temporary off-hook condition, the equipment transmits status reporting signals to the central office and keeps on repeating the off-hook condition and the signaling until the equipment is "reset" or has timed-out automatically. The central office linefinding equipment identifies the subscriber as it does in the case of a normal outgoing call and receives the status reporting signals. The subscriber's identity and information concerning the status of his premises are forwarded by the central office to an entity which can take corrective action.

The last two systems require equipment and/or programming modifications to the central office with which they operate. Thus, the supervisory service becomes available to the subscriber only after the telephone company servicing his area decides to incorporate the necessary changes into the central office.

A further disadvantage of all three of the above-discussed systems is that they typically report only after conditions at the premises have become abnormal. There is no way for the absent subscriber to assure himself, at any time he so desires, that conditions at his premises are in fact "normal". When the subscriber desires a status report, he may be located anywhere, including overseas. It would be highly desirable if the owner could receive the status report simply by placing a normal telephone call through the telephone network to his vacant premises. It would also be desirable if such a service could be provided without the need for modifying the telephone central office or other equipment.

Another function which an owner often desires to perform while absent from his premises is to control certain operations there. The absent owner may, for example, want to activate lights, appliances or other devices, change a thermostat setting or perform other such functions prior to his return. It would also be desirable if apparatus were available which enabled an owner to perform such functions simply by placing telephone calls to his vacant premises.

OBJECTS OF THE INVENTION

It is, therefore, a broad object of this invention to provide improved apparatus for enabling an owner, who is temporarily absent from his premises, to monitor the condition of his premises from a remote location.

Another object of the invention is to provide apparatus of the type described that enables the monitoring to be performed utilizing existing telephone lines and equipment.

Another object of the invention is to provide apparatus of the type described that enables a telephone subscriber to obtain a status report of the conditions at his premises by placing a telephone call thereto.

Another object of the invention is to provide apparatus for enabling an owner, who is temporarily absent from his premises, to control certain operations at his premises from a remote location.

Another object of the invention is to provide apparatus of the type described that enables the owner to control operations at his premises by placing telephone calls thereto.

Another object of the invention is to provide apparatus of the type described that can be implemented without modification to the telephone central office equipment or programming serving the subscriber.

Still another object of the invention is to provide apparatus of the type described that is relatively simple in construction and inexpensive to produce.

SUMMARY OF THE INVENTION

In accordance with the invention, responder apparatus is installed at a telephone subscriber's premises and connected to the subscriber's telephone line. Various sensors are connected to the responder apparatus which sense conditions at the premises. The responder apparatus is adapted to provide a status report of the conditions at the premises upon receiving a telephone call from the absent subscriber.

Normally, an individual who makes a telephone call to a party will decide that the called party is absent if there is no answer after about 10 or so rings. The individual then usually hangs up. According to this invention, an absent subscriber who is seeking a status report will call his premises and allow his telephone subset to ring a predetermined number of times, n, which number is well in excess of the number of rings normally allowed, e.g., n=24 or more rings. The responder apparatus at his premises is adapted to count the number of rings received during a call and, after receiving the predetermined number of rings n, to cause the subscriber's line to go off-hook for a short period of time. After creating the off-hook condition, a status reporting unit in the responder apparatus transmits signals over the subscriber's line which are indicative of the conditions at the premises. The signals may be in the form of coded tones which are recognizable by the subscriber and which are generated (or not generated) depending upon the status of the sensors coupled to the apparatus. After the status report is completed, the responder apparatus automatically returns the subscriber's line to an "on-hook" condition ready to accept additional calls.

According to another feature of the invention, the responder apparatus may, upon receiving subsequent calls from the absent subscriber, initiate various control functions at the subscriber's premises. A timer in the responder apparatus starts running as the status report is given during the first telephone call from the subscriber. If, after the status report is completed and during the running interval of the timer, the subscriber places a second call to his premises, the responder apparatus will again count the number of rings it receives. Upon receiving a predetermined number of rings m, which is less than the predetermined number n, a control relay in the apparatus is energized and maintained in its energized state. The terminals of the control relay may be wired to control the flow of electric power to a set of lights, an appliance or other such device. The energization of the control relay also sets the status reporting unit so that, upon receiving n rings, the status report is given as described above together with an indication that the control function desired has been initiated.

Additional control relays may be incorporated in the responder apparatus which responds respectively to third and additional telephone calls from the subscriber during the running interval of the timer to control additional functions. All control relays are de-energized and all control functions are reversed by placing a subsequent telephone call to the premises after the timer has timed out.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF ILLUSTRATIVE EMBODIMENT

Figure 1:
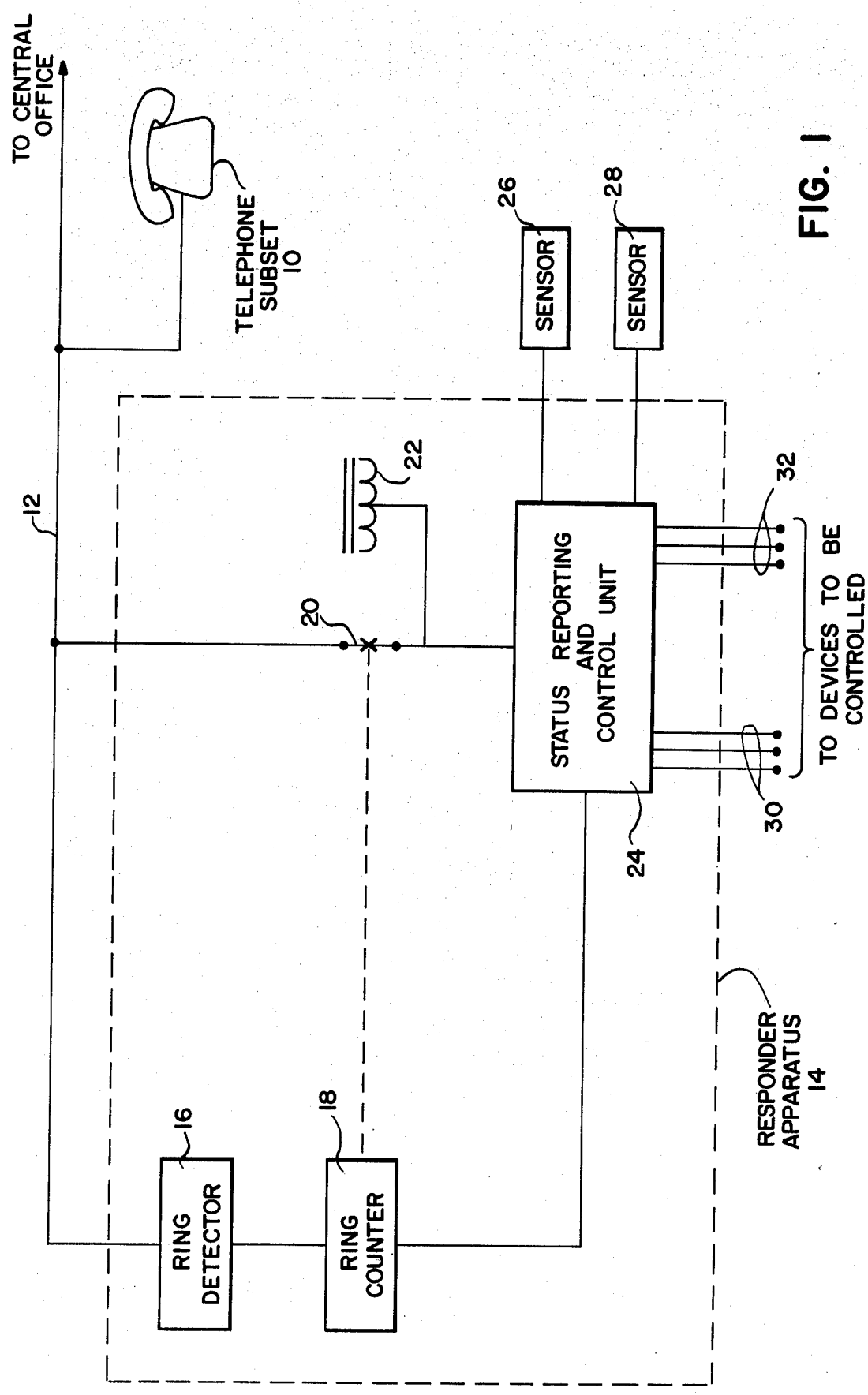
FIG. 1 is a partially schematic, partially block diagrammatic illustration of the basic components of responder apparatus embodied according to the invention.

Referring now specifically to FIG. 1 of the drawing, there is shown a subscriber telephone subset 10 which is connected in the conventional manner to a subscriber line circuit 12 extending to a telephone company central office (not shown). Telephone calls are carried to and from the central office by the circuit 12. Also connected to the circuit 12 is responder apparatus 14 embodied in accordance with the invention. The responder apparatus 14 includes a ring detector 16 which detects incoming ring signals on the circuit 12 and the ring counter 18 which counts the number of incoming rings detected by the detector 16. The counter 18 is so arranged that when a predetermined number n of rings has been detected during an incoming call, it temporarily closes a contact 20. The closing of the contact 20 provides an off-hook condition on the subscriber circuit 12 by coupling the circuit to a DC passing circuit element 22 which may be a hold coil.

The predetermined number n of rings is selected to be well in excess of the number of rings a calling party will normally allow prior to hanging up because there is no answer. The number n may, for example, correspond to 24 rings.

Figure 2:
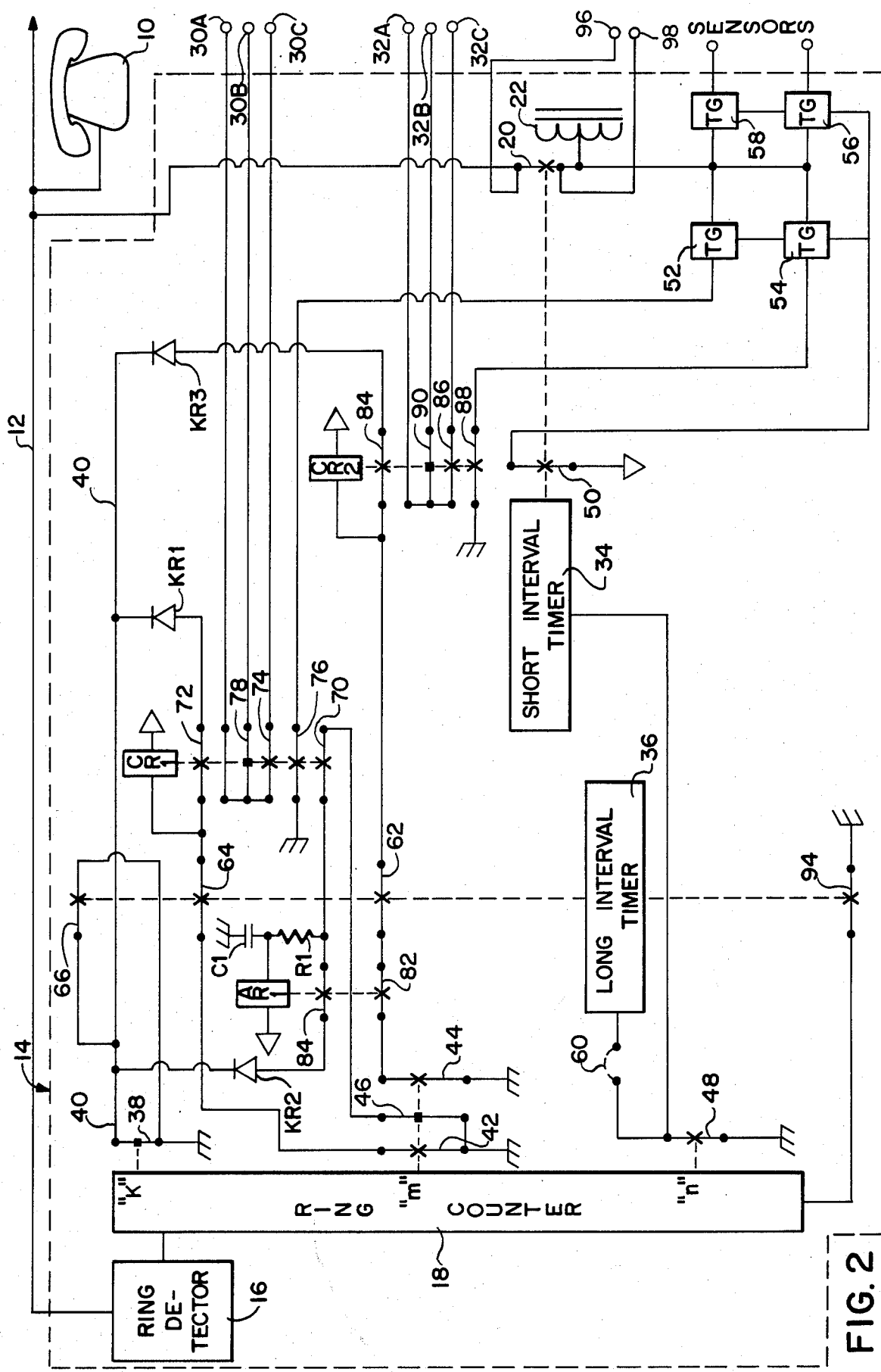
FIG. 2 is a partially schematic, partially block diagrammatic illustration showing the apparatus of FIG. 1 in further detail.

It may be noted paranthetically at this point that the well known schematic "detached contact" notation is used in FIGS. 1 and 2. According to this notation, an "X" shown intersecting a conductor represents a normally open, or make, contact of a relay, and a bar shown intersecting a conductor at right angles represents a normally closed, or break, contact of a relay, where "normally" refers to the unenergized condition of the relay.

The closing of the contact 20 on the nth ring also connects a status reporting and control unit 24 to the subscriber circuit 12. The unit 24 operates under the control of sensors 26 and 28 which are located at the subscriber's premises. The sensors 26 and 28 are arranged to sense various conditions at the premises. Sensor 26, for example, may be a temperature sensor which transmits an indicating signal to the unit 24 if the temperature sensed thereby is below a certain level. Sensor 28 may be an intrusion switch at a door or window of the premises which transmits an indicating signal to the unit 24 if the door or window has been opened. Although only two sensors 26 and 28 are shown in FIG. 1, any number of sensors may be included which sense any of a wide variety of conditions at the premises.

The subscriber who is absent from the premises and who wishes to obtain a status report simply dials his own telephone subset 10 from wherever he is and allows the subset 10 to ring n times. On the nth ring, as discussed above, the apparatus 14 creates a temporary off-hook condition on the circuit 12, and temporarily connects the unit 24 to the circuit 12. The unit 24 is arranged to transmit, under the control of sensors 26 and 28, reporting signals over the circuit 12 to the calling subscriber. These reporting signals are indicative of the conditions at his premises.

The reporting signals may be in the form of coded single or multiple tones. The signals can take many different forms. For instance, a steady tone may indicate that all monitored conditions are "normal". Single-tone "dashes" may indicate low temperatures, pairs of dashes may indicate high temperatures, a series of "dashes" may indicate loss of power and either single dashes or pairs of dashes followed by a series of "dashes" may indicate a combination of abnormal temperatures and the loss of power. Such tone signals can easily be recognized by the person who places the call.

As a further example, the absence of any tones during the reporting may indicate that conditions are "normal" at the premises. A low frequency tone may indicate that the temperature of the premises is below a certain level. A high frequency tone may indicate that an intrusion has taken place. Numerous other such tone indication schemes are possible. The subscriber may even be provided with a tone decoder (not shown) which receives and decodes the tone signals for the subscriber.

By using tone-pairs corresponding to "touchtone" or other multi-frequency signalling systems, it is possible to let an automatic decoder determine the nature of the alarm by sensing the tone and combination and decoding it into the corresponding numeral. Each numeral may be assigned to indicate a predetermined condition.

The tone signal status report by the unit 24 may take several seconds. After the report is completed, the counter 18 opens contact 20 to return the circuit 12 to an "on-hook" condition ready to receive additional calls.

The unit 24 is further adapted to initiate control functions at the premises in response to subsequent telephone calls from the subscriber. A first control function is initiated by placing a second telephone call to the premises within a predetermined time period (e.g., 60 seconds) of receiving the status report during the first telephone call. In response to the mth ring of the second call, where m is less than n, the counter 18 activates the unit 24 which, in turn, either makes or breaks a circuit between one of its output terminals 30 and another of its output terminals 30. The unit 24, in effect, serves as a remote control switch for an electrical device that is connected to two of the three output terminals 30 so that the device may be either turned on or turned off in response to the second call.

In response to the nth ring of the second call, the counter 18 again closes the make contact 20, causing the circuit 12 to go off-hook, and again causes the unit 24 to transmit its status report. In this case, however, the status report includes not only signals corresponding to the sensors 26 and 28, but also a signal (e.g., coded tone) indicating that the first control function has been initiated.

If the subscriber places a third call to the premises within a predetermined time period (e.g., 60 seconds) of receiving the second status report during the second call, the unit 24 will initiate a similar switching effect at its output terminals 32. A second electrical device connected to the terminals 32 may thereby also be turned on or off. The devices that are connected to the terminals 30 and 32 may be lamps, appliances or the like. The terminals 30 and 32 may also be connected to an electromechanical device such as a solenoid which operates to change a setting on a dial such as a thermostat dial.

On the nth ring of the third call, a status report is again given which includes an indication that the second control function has been initiated.

The switching operation at the terminals 30 and 32 may be reversed by placing still another call to the premises after the expiration of the predetermined time period (e.g., 60 seconds) from the last status report. Such a delayed call causes the unit 24 to switch the terminals 30 and 32 back to their original condition.

FIG. 2 illustrates further specific details of the responder apparatus 14 of FIG. 1. Shown in FIG. 2 is the telephone subset 10, the subscriber circuit 12, the ring detector 16, the ring counter 18, the make contact 20 and the hold coil 22 of FIG. 1. The responder apparatus 14 includes relays CR1, AR1 and CR2 and timers 34 and 36 which control various make and break contacts that provide the desired operation discussed hereinabove.

It is assumed initially that all of the relays and timers of FIG. 2 are de-energized and that the subscriber has placed an initial call to his premises. The ring detector 16 detects the ringing of the subset 10 and the ring counter 18 counts the rings. On the count of k rings, where k is less than m and less than n previously discussed, the counter 18 temporarily opens break count 38 to disconnect a relay holding circuit 40 from ground. This, however, has no effect on any of the relays CR1, AR1 and CR2 as they are already de-energized.

On the count of m rings, the counter 18 temporarily closes make contacts 42 and 44 and temporarily opens break contact 46. Again, these contacts make or beak various alternate ground paths to the relay holding circuit 40, but have no effect on the circuitry as the relays CR1, AR1 and CR2 are all de-energized.

On the count of n rings, counter 18 temporarily closes make contact 48 which, in turn, energizes short interval timer 34. Timer 34 immediately closes its make contacts 50 and 20, keeps them closed for a predetermined time period (e.g., 10 seconds), after which it releases or opens the contacts 50 and 20 again.

The closing of make contact 50 applies power to tone generators 52, 54, 56 and 58 which form part of the status reporting unit 24 of FIG. 1. The closing of make contact 20 cause the subscriber circuit 12 to go off-hook and connects the tone generators 52 through 58 to the circuit 12. Tone generators 56 and 58 are controlled by the sensors 26 and 28, respectively, of FIG. 1. If either or both of the sensors 26 and 28 has been activated by an "abnormal" condition, its corresponding tone generator 56 and 58 transmits a coded tone over the circuit 12 to the calling subscriber indicative of the nature of the abnormality. This report takes place during the 10 second interval of the timer 34. After 10 seconds, the timer 34 releases contacts 50 and 20 and the circuit 12 again goes "on-hook".

A long interval timer 36 is also connected to make contact 48 through an option strap 60. The closing of contact 48 on the nth ring of the first call thus also energizes timer 36 which, in turn, closes its make contacts 62, 64 and 66. The timer 36 holds its make contacts closed for a period of time which is long enough to permit the subscriber to redial his premises if he desires to initiate a control function. This time period is illustratively 60 seconds.

The option strap 60 may be eliminated if the control function feature of the apparatus 14 is not desired. In such an event, the timer 36 is never activated.

Assume that the option strap 60 is included and that the subscriber places a second telephone call to his premises while the timer 36 is still running due to the first call. On the kth count of this second call, counter 18 again temporarily opens its break contact 38. Again, however, nothing happens as all relays CR1, AR1 and CR2 are de-energized. Even if one or more of the relays CR1, AR1 and CR2 were energized, they would not be released at this time as the break contact 38 is bridged by make contact 66 of timer 36 which, it is noted, provides an alternate path to ground for the relay holding circuit 40.

On the mth ring of the second call, the closing of make contact 42 energizes relay CR1 through the closed make contact 64 of timer 36. Break contact 46 interrupts the circuit over which relay AR1 can be energized. Relay CR1, when energized, closes its make contacts 70, 72, 74, and 76 and opens its break contact 78. Relay CR1 is maintained in an energized state as a holding path is provided through its own make contact 72 and diode KR1 to relay holding circuit 40.

Relay CR1 serves as a switch to control the output terminals 30 (30A, 30B and 30C in FIG. 2) of the apparatus 14. The flow of electric power to a device to be controlled may be either started or stopped depending upon how the device is connected to the terminals 30A, 30B and 30C. If the device is connected to terminals 30A and 30B, for example, the opening of break contact 78 serves to cut the flow of electrical power to the device. If, on the other hand, the device is connected to terminals 30A and 30C, the closing of make contact 74 serves to supply power to the device.

Make contact 70 of relay CR1 prepares a circuit for energizing auxiliary relay AR1. It is noted that the relay AR1 can only be energized after break contact 46 of counter 18 is released and closed. As a further assurance against the premature energization of relay AR1, its energization is delayed by a delaying network consisting of resistor R1 and capacitor C1. As a result of the delayed energization of relay AR1, relay CR2 cannot be energized during the second call (make contact 82 of relay AR1 is open prior to its energization). Relay AR1, once energized, remains energized as it closes a holding path through its own make contact 84 and diode KR2 to the relay holding circuit 40.

On the nth ring of the second call, the circuitry described previously causes the off-hook condition on the circuit 12 and causes the tone generators 52 through 58 to give their report. In this case, the closing of make contact 76 of relay CR1 applies ground to tone generator 52 causing that tone generator to transmit a coded tone as part of the report which indicates that the first control function has been successfully initiated. The closing of make contact 48 of counter 18 on the nth ring of the second call also resets timer 36 which again runs for its full interval (e.g., 60 seconds). Relays CR1 and AR1 remain energized even if timer 36 times out.

The subscriber may place a third call to his premises before the timer 36 times out for the second time thereby to initiate a second control function. On the mth ring of the third call, relay CR2 is energized by the closing of make contact 44. Relay CR2 controls its make contacts 84, 86 and 88 and its break contact 90. Relay CR2 is held up through its make contact 84 and diode KR3 to the holding circuit 40. Make contact 86 and break contact 90 provide switching control for output terminals 32A, 32B and 32C in the same manner as contacts 74 and 78 of relay CR1. Make contact 88 of relay CR2 activates tone generator 54 so that the status report that is given on the nth ring of the third call includes an indication that the second control function has been successfully initiated.

Timer 36 is reset for a second time on the nth ring of the third call. If the subscriber desires to release relays CR1 and CR2, he should wait for timer 36 to time out before placing an additional or fourth call to his premises. On the kth ring of the fourth call, all relays are released by the opening of break contact 38 (bridging contact 66 is open after timer 36 times out).

In summary, therefore, I have described apparatus which enables a telephone subscriber to monitor the condition of his vacant premises simply by placing a telephone call thereto from a remote location. The subscriber is further enabled to effect control from a remote location over devices at his premises by placing subsequent calls thereto. The conditions monitored and the devices controlled at the premises may be selected and varied at the subscriber's discretion. The apparatus which accomplishes these functions has the further advantage of being relatively simple in construction and therefore, inexpensive to produce.

It should be understood that the foregoing apparatus is intended to illustrate rather than limit the invention and that various modifications may be made thereto by those skilled in the art without departing from the scope of the invention as defined by the appended claims. For example, although only two control relays are shown in FIG. 2, it is evident that three or more such control relays could be included which are energized in sequence by successive telephone calls to control additional functions at the premises. The last of the sequence of control relays could have one of its break contacts wired in below break contact 38 of FIG. 2 so that, when the relay is energized, it would break the ground path for the holding circuit 40. In such a case, energizing the last of the control relays would release and de-energize all prior ones. The timer 36 may also include an additional make contact 94 which closes when the timer 36 is activated and applies a ground signal to the counter 18. The counter 18, in response to the ground signal, could be arranged to alter the ring count on which the m and n contacts are energized.

The apparatus 14 of FIG. 2 may also be adapted for use with special equipment, such as a voice recorder, teleprinter or the like, to enable the subscriber to send messages to his premises from a remote location. The special equipment could, for example, be interfaced at terminals 96 and 98 of FIG. 2 which bridge make contact 20. Upon receiving a special message start command from the subscriber over the circuit 12, the equipment would connect itself to the circuit 12 and override the make contact 20 to establish an extended off-hook condition during which the message is received. Upon receiving a special "message end" command from the subscriber, the equipment could disconnect itself from the circuit 12 and return the apparatus 14 to its normal operating condition.

It is therefore believed that the foregoing and other modifications come within the true spirit and scope of the invention.

What I claim as new and desire to secure by Letters Patent of the United States is:

1. Apparatus connectable at a telephone subscriber's premises to a subscriber circuit including a telephone subset, said apparatus being adapted to enable the transmission of a status report of conditions at the premises in response to the receipt of a telephone call from a remote location, said apparatus comprising:

A. means for detecting ring signals received on the subscriber circuit during an incoming telephone call;

B. means coupled to said ring signal detecting means for counting the number of incoming ring signals received on the subscriber circuit, said counting means being responsive to the receipt of a predetermined number n of incoming ring signals, where n is greater than one, for establishing an off-hook condition on the subscriber circuit;

C. status reporting means responsive to the establishment of the off-hook condition on the subscriber circuit by said counting means for generating and transmitting a reporting signal over the subscriber circuit during the off-hook condition, said status reporting signal being recognizable by a calling party and being indicative of conditions at the premises;

D. means responsive to the transmission of the status reporting signal by said status reporting means for returning the subscriber circuit to an on-hook condition; and E. means for enabling the performance of a control function at the premises in response to the receipt of a second telephone call from a remote location subsequent to the aforementioned first telephone call, said control function means including electrical switching means operable in response to the receipt by said counting means of a predetermined number m of incoming ring signals during the second telephone call.

2. Apparatus as recited in claim 1 in which said counting means includes timing means which is activated in response to the receipt of said predetermined number n of incoming ring signals for causing the off-hook condition on the subscriber circuit and for activating said status reporting means to generate and transmit the reporting signal, said timing means, after the expiration of a predetermined time interval, de-activating said status reporting means and operating said returning means to return the subscriber circuit to an "on-hook" condition.

3. Apparatus as recited in claim 2 in which said predetermined time interval of said timing means is about ten seconds.

4. Apparatus as recited in claim 2 in which said counting means establishes the off-hook condition on the subscriber circuit in response to the receipt of about twenty-four incoming ring signals.

5. Apparatus as recited in claim 1 in which said status reporting means includes tone generating means for generating the reporting signal in the form of a coded tone signal recognizable by a calling party and indicative of conditions at the premises, said tone generating means generating the coded tone signal under the control of a condition sensor at the premises.

6. Apparatus as recited in claim 1 in which said status reporting means includes a plurality of tone generating means for generating a plurality of reporting signals in the form of coded tone signals recognizable by a calling party and indicative of conditions at the premises, said tone generating means generating the coded tone signals under the control of condition sensors at the premises.

7. Apparatus as recited in claim 1 in which said counting means establishes the off-hook condition on the subscriber circuit in response to the receipt of greater than about ten incoming ring signals.

8. Apparatus as recited in claim 1 in which said control function means further includes timing means which is activated in response to the receipt of said predetermined number n of incoming ring signals during the first telephone call for enabling the operation of said electrical switching means, said timing means, after the expiration of a predetermined time interval, disabling the operation of said electrical switching means, whereby only when the second call is received during the predetermined time interval of said timing means can said electrical switching means be operated.

9. Apparatus as recited in claim 8 in which the predetermined time interval of said timing means is about sixty seconds.

10. Apparatus as recited in claim 8 in which said control function means includes means for reversing the operation of said electrical switching means in response to the receipt by said counting means of a predetermined number k of incoming ring signals during a third call subsequent to the first and second call and after the expiration of the predetermined time interval of said timing means.

11. Apparatus as recited in claim 1 in which said predetermined number m of incoming ring signals during the second call, upon which said counting means operates said electrical switching means, is less than said predetermined number n of incoming ring signals during the first call upon which the off-hook condition on the subscriber circuit is established.

12. Apparatus as recited in claim 1 in which said status reporting means includes tone generating means operable under the control of said electrical switching means for generating another reporting signal in the form of a coded tone signal recognizable by a calling party and indicative of the fact that said electrical switching means has been operated.

13. Apparatus as recited in claim 1 in which said control function means includes a plurality of electrical switching means, one of said electrical switching means being operable in response to the receipt of said predetermined number m of incoming ring signals during the second telephone call and another of said electrical switching means being operable in response to the receipt of said predetermined number m of incoming ring signals received during a third call subsequent to the first and second call, whereby a plurality of control functions may be performed at the premises.

* * * * *